April 21, 1964  W. H. WATSON ETAL  3,130,030
MANUFACTURE OF HOLLOW ARTICLES BY BLOWING IN A MOULD
Filed Dec. 16, 1960  4 Sheets-Sheet 2

INVENTORS
WILFRED HERBERT WATSON
GEORGE BLOOD
ATTORNEY

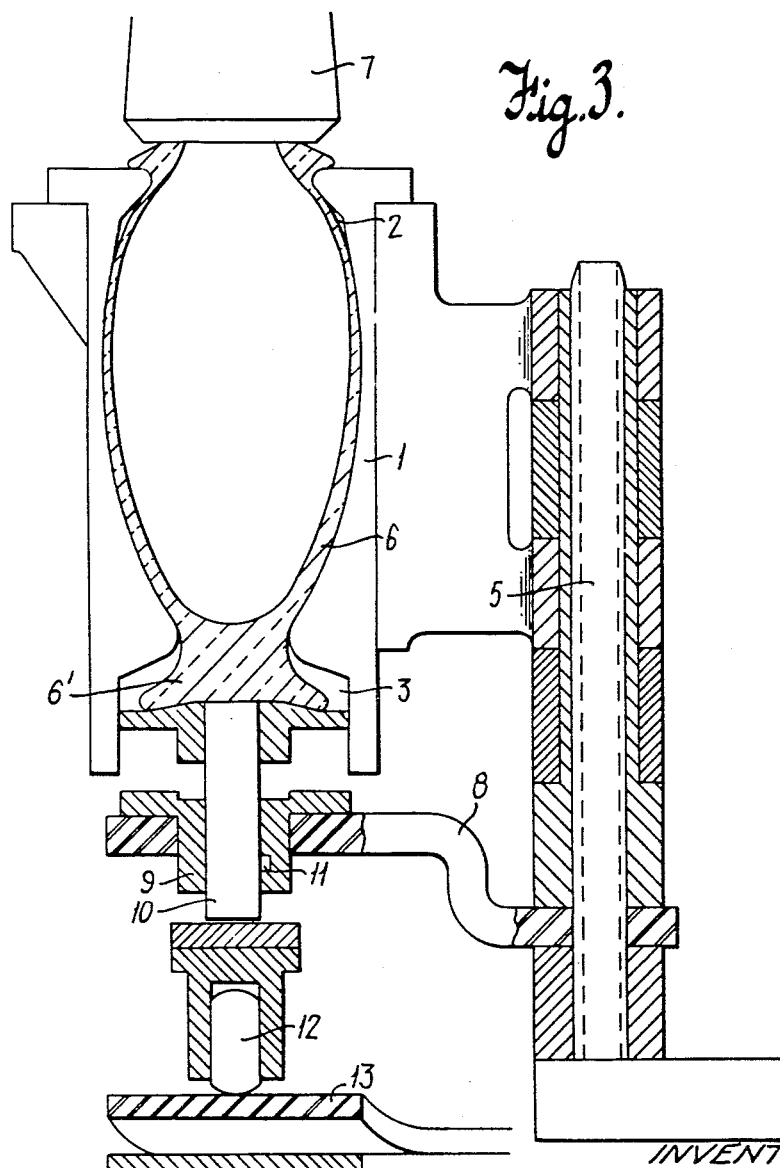

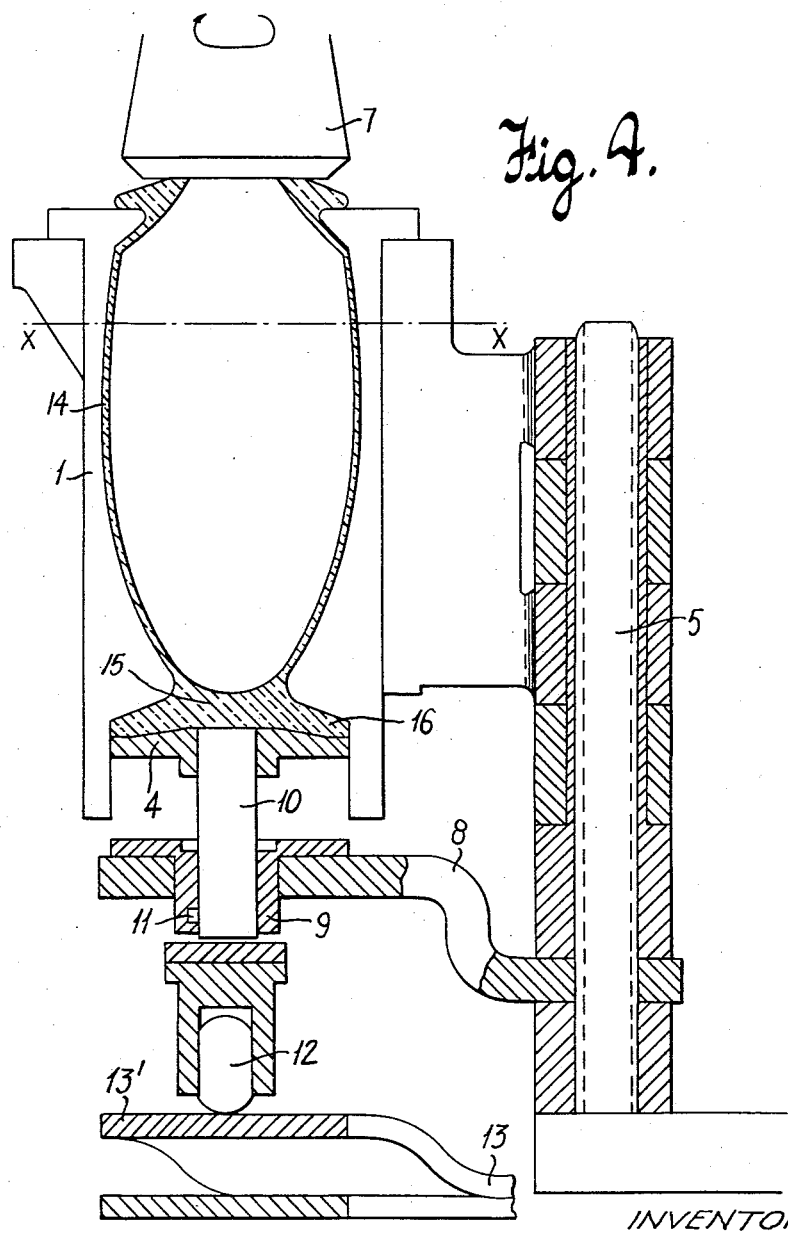

United States Patent Office 3,130,030
Patented Apr. 21, 1964

3,130,030
MANUFACTURE OF HOLLOW ARTICLES
BY BLOWING IN A MOULD
Wilfred Herbert Watson, Newbold, Chesterfield, and George Blood, Chesterfield, England, assignors, by mesne assignments, to Associated Electrical Industries Limited, London, England, a British company
Filed Dec. 16, 1960, Ser. No. 76,223
Claims priority, application Great Britain Feb. 14, 1957
2 Claims. (Cl. 65—79)

This invention relates to the manufacture of hollow articles of glass or other material which, starting from a viscous state and being capable of setting to a solid state, can be formed to shape by blowing in a mould. In particular the invention is concerned with the manufacture of such articles which comprise, as manufactured, a hollow bowl portion and a solid base portion united through an intervening portion of relatively narrow cross-section. Drinking glasses and tumblers, such as so-called lager glasses, are an important example of the kind of article concerned. The present application constitutes a continuation-in-part of our application No. 711,733, filed January 28, 1958.

In manufacturing drinking glasses or other articles having a solid base or foot joined to the bowl through an intervening portion of relatively narrow cross-section, it is difficult if not impossible to form the solid portion by the blowing operation used for forming the bowl. This is because the blow mould is necessarily of constricted cross-section where the narrow intervening portion of the article is to be formed, with the result that a correspondingly small area is exposed to the blowing pressure at the base of the bowl and prevents the blowing pressure from forcing the glass solidly into the required shape for the foot. Consequently such drinking glasses and like articles are currently made by two-piece processes which may vary in detail but which in general involve two or three distinct operations, namely a blowing operation to form the bowl, a pressing operation to form a separate foot and a joining operation in which the bowl is joined to the foot, these last two operations possibly being carried out together. Each operation may itself involve a number of steps.

It would clearly be advantageous to be able to make such articles by a one-piece process and indeed some twenty-five to thirty years ago a one-piece process was proposed (see Schutz Patent No. 1,972,717) according to which not only the bowl portion of the article but also the foot portion were first blown into a hollow form and then the foot portion was re-formed into a solid (i.e., non-hollow) form by a pressing action produced by raising the base of the mould, the mould base being for this purpose made vertically movable with respect to and within the confines of the sides of the mould and being constituted by a number of telescopically interfitting, spring-loaded annular parts which, starting with the outermost part, were successively halted during the raising of the mould base to form the foot. However, this one-piece process had many disadvantages and limitations and subsequent patent and other literature shows that two-piece processes continued to be used and developed. One disadvantage of the aforesaid one-piece process, apart from the complicated form of mould base which it requires, is that there is an obvious danger of entrapping pockets of air in the foot portion in reforming it from its hollow form to its final solid form. This danger may be to some extent lessened by the telescopic action of the mould base, by which the foot is progressively pressed up into its solid form from its outer periphery towards the centre, but it is nevertheless still present. It is true that, as is pointed out in Schutz Patent No. 1,977,091, the corrugated or stepped formation of the underside of the foot, resulting from the telescopic action of the mould base in pressing the foot, may to some extent hide any blisters or other defects that may happen to be present in the internal glass structure, but such defects are nevertheless clearly undesirable. Moreover it may not be desirable to have a stepped underside to the foot of the article, particularly if one is anxious to obtain a plain under surface such as is found in hand-made glass-ware of the same general form. The aforesaid one-piece process also suffers in the limitation that it imposes on the narrowness of the intervening portion between the bowl and the foot. This limitation arises from the fact that, in blowing up the bowl and the foot together, the expanding charge of glass will first contact the sides of the mould at its constriction corresponding to this intervening portion. If this contact occurs too soon, before enough glass for the foot has been blown through the constriction into the lower part of the mould, the resultant cooling of the glass in the region of the contact will tend to rigidify it there and further flow of glass into the lower portion of the mold will be inhibited. Consequently there is imposed on the diameter of the constriction and therefore on the narrowness of the intervening portion of the article being moulded, a definite lower limit which is rather higher than might be desirable.

It is an object of the invention to provide for the manufacture of articles of the kind in question an improved one-piece process which can give more satisfactory results without the need for complicated mould base structures and with the possibility of obtaining, if so desired, a ratio of as high as 2:1 between the diameter of the foot and the diameter of intervening portion between the foot and the bowl.

The essence of the present invention is that, instead of blowing up the foot portion in a hollow form and then re-forming it by raising the mould base, the charge of the glass or other material, after a preliminary blowing action (corresponding to the usual initial puff) but before the main blowing action, is allowed to elongate on to a suitable surface, which may be and preferably will be the mould base, so that the lower end of the charge settles on to this surface and an accumulated mass of glass is obtained at this lower end. With the charge enclosed in an appropriate mould the subsequently initiated main blowing action blows up the upper portion of the charge into the required form for the bowl portion of the article, but the accumulated mass at the lower end of the charge remains unblown. Moreover although the glass of the blown portion immediately tends to rigidify by reason of its contact with and consequent cooling by the sides of the mould, the accumulated mass by reason of its greater solid volume remains viscous and workable. The mould base, which is movable vertically with respect to the mould sides and can be constituted simply by a plate-like part which preferably has a slightly convex upper surface, is then moved upwardly so that it exerts on the unblown mass at the lower end of the charge, a press-moulding action by which the foot of the article is formed in the required shape. As there is no question of this foot being reformed from a hollow form, there is no danger of entrapping pockets of air by the foot-forming step of the process. The blowing air is preferably kept on during the press-moulding of the foot, so as to provide a counter pressure to the pressing action and also to support the bowl portion against collapse should it not by this time be fully rigidified.

In carrying out the invention for an article the outer surface of which defines a solid of revolution, it is preferred that, relative rotation should be effected, as is common, between at least the sides of the mould and the material being moulded within it, this tending to give a better surface finish to the article and also eliminating join lines on the article resulting from the use of a split mould. Conveniently, whether the invention is carried out by hand or machine, such relative rotation is effected by rotation of the charge of material rather than of the mould, and whereas the base of the mould may then be permitted to rotate with the charge it is preferred, again for the sake of good surface finish, that the base should be restrained against rotation so that relative rotation occurs also between the base and the charge.

The process of the invention may be carried out in a machine of the well-known Westlake type modified by the provision of moulds having bases which instead of being integral with the mould sides are vertically movable with respect thereto in the moulding position of the moulds; by the provision of automatic or manual means permitting the bases of the moulds to be raised with respect to their sides at an appropriate position in the operating cycle of the machine; and by any necessary re-timing of the various steps in the operating cycle. Automatic raising of the mould bases may be provided for by cam means so formed and positioned with respect to the path of movement of the moulds as to raise the mould bases to the required extent as the moulds pass the cam means in the operating cycle of the machine. Depending on the form of an article being produced, Westlake machines in general may include, at a position before that at which the suspended charge is enclosed in the mould, a so-called paddling or marver plate over which the suspended charge is taken so that its lower end is subject to a preliminary thickening in well-known manner. In employing a modified Westlake machine for the purposes of the present invention, this paddling plate may be used as the required settling surface, but preferably the base of the mould is employed as the settling surface as previously indicated. In this latter case the paddling plate may be dispensed with, or it may be retained.

For a fuller understanding of the invention reference may be had to the accompanying drawing in which is illustrated the form and relationship of certain relevant parts of a glass-blowing machine suitable for carrying out the manufacture according to the invention of a glass tumbler having a bowl portion and solid base or foot portion united through a narrow intervening portion. It will be assumed that the glass-blowing machine is of the Westlake type which is modified in respect of the parts illustrated but is otherwise of normal construction. Thus the moulds of the machine will be understood to follow each other round a circular path at different angular positions along which the various steps of the manufacture are carried out. In the drawing:

FIG. 3 shows in axial section a mould with a partially formed article therein at a later stage of the manufacture, and FIG. 4 shows in axial section a mould with a fully formed article therein at a still later stage of the manufacture.

Figure 1:
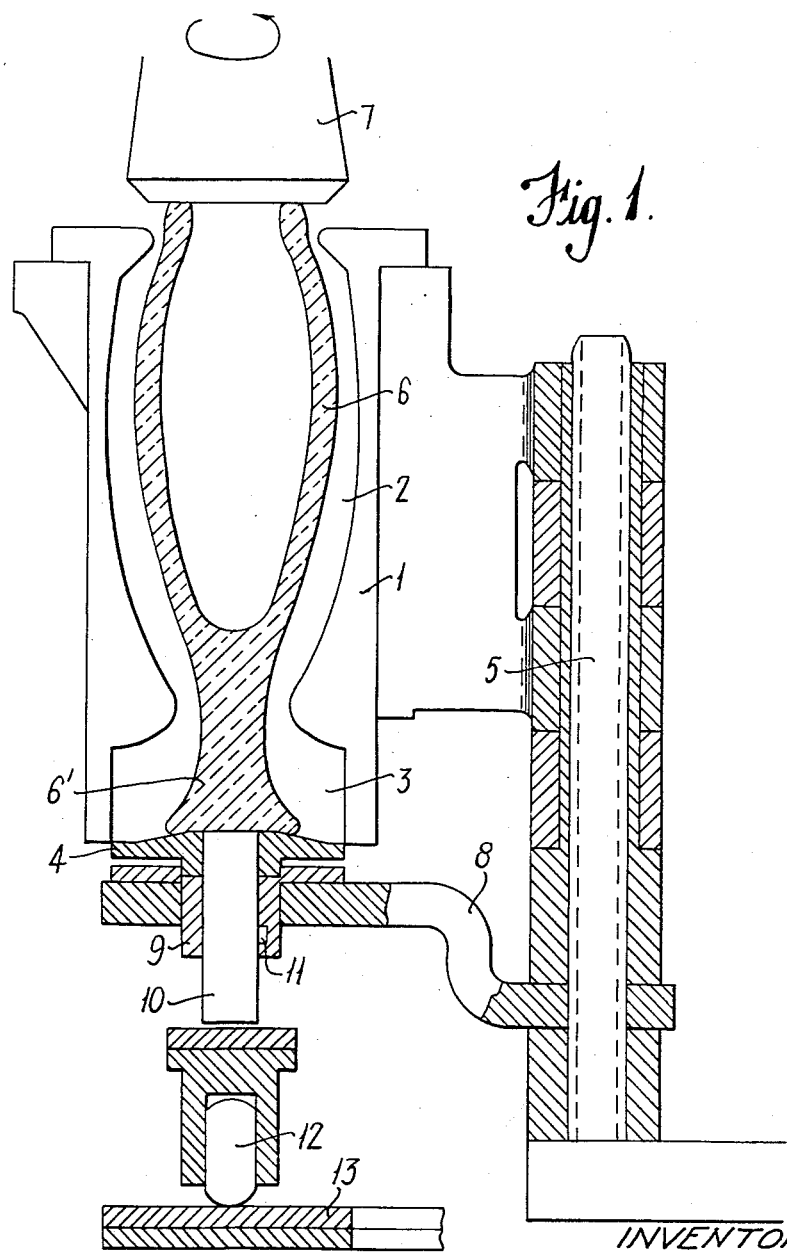
FIG. 1 shows in axial section a mould with a partially blown charge of glass therein at an early stage in the manufacture of an article.

The moulds shown in FIGS. 1, 3 and 4 may be considered either as being the same mould in different angular positions, or as being different moulds appropriately spaced round the machine.

Figure 2:
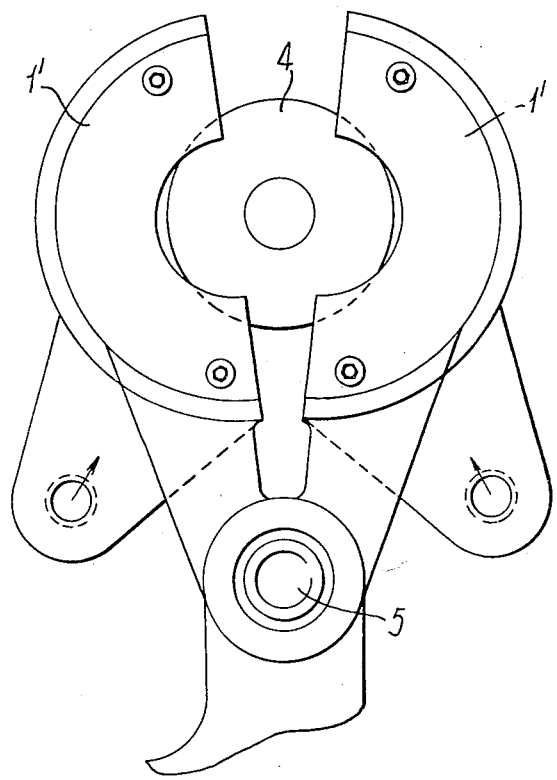
FIG. 2 is a plan view of a mould having two separable halves which are shown in the separated relationship which they occupy prior to the mould receiving a charge of glass.

Referring to the drawing, each mould has a split form comprising two separable halves 1'—1' (FIG. 2) which when closed together define the sides of the mould cavity 2 (FIG. 1) and embrace, within a vertically sided portion 3 of said cavity adjacent its lower end, a separate vertically movable plate-like base member 4 the upper surface of which is somewhat convex. The base member 4 has a periphery conforming to and fitting within the inner periphery of said vertically sided portion 3 and acts pistonwise in the latter to constitute a presser for the base of an article being blown in the closed mould. As in the usual Westlake machine the mould halves 1'—1' are hinged on a common hinge pin 5 to permit their separation and closure at appropriate times. For each mould 1 a charge of glass 6 (FIG. 1) is suspended at the end of a rotatable blow tube 7 of the machine, as is normal in a Westlake machine. The hinge pin 5, or a support (not shown) for it, also carries a fixed bearing arm 8 in a bearing 9 on which is located and guided for vertical movement a stem 10 carrying at its upper end the base member 4 for the mould 1. For convenience in forming the bearing 9, the stem 10 may be of circular cross-section, in which event rotation of the base member with the charge 6 may be avoided, if so required, by some appropriate form of keying or pinning 11 between the stem 10 and the bearing arm 8. The lower end of the stem 10 carries, or as shown is engaged by, a cam follower roller 12 positioned for engagement by an annular cam plate 13 having a raised cam portion 13' (FIG. 4) at an appropriate angular position for raising the mould base 4.

The blow pipe 7, which moves round with its associated mould 1, receives a charge of molten glass in an upright position (not shown) and is then swung downwards to position the charge over the base 4 and between the two halves 1'—1' of the mould, which at this time are separated as shown in FIG. 3. A puff of air is blown into the charge to produce the usual initial blowing action at this stage. The two halves of the mould 1 are then closed round the charge which, being suspended at the now lower end of the blow pipe 7, is elongating under its own weight and beginning to settle on the base 4. This is the stage of the operation which is illustrated in FIG. 1 and it will be noted that the base 4 of the mould 1 is at this stage in its lowermost position. The blow tube 1 has been rotating all this time, and continues to do so. The various actions described are carried out automatically by the machine at successive angular positions of the mould 1.

At a subsequent angular position reached by the mould 1 when the settling action has had time to result in the accumulation of a substantial end mass 6' at the lower end of the charge, a final blowing action on the charge 6 is initiated and this results in the upper portion of the charge being formed against the inside of the mould 1 into the shape required in the finished tumbler for the bowl portion 14 (FIG. 3). The accumulated end mass 6', lying within the lower part 3 of the mould 1, remains unblown. The angular position of the raised portion 13' of the cam plate 13 is so chosen that when the mould reaches it the final blowing action will have resulted in at least partial formation of the bowl portion (FIG. 3) but the accumulated end mass of the charge is still in a mouldable state by virtue of its greater solid volume. Consequently on reaching this latter angular position the raised portion 13' of the cam plate 13 starts to act through the follower roller 12 and the stem 10 to raise the base 4 of the mould (FIG. 3) and thereby to exert a press-moulding action on the unblown end mass 6' of the charge 6, which is thus finally pressed up into the required base or foot 16 having a portion 15 of constricted cross-section between it and the bowl portion 14 (FIG. 4). It then remains to remove the tumbler from the mould once the glass in the base 16 has sufficiently set (this being done by hinging the two halves of the mould apart at an appropriately chosen subsequent angular position) and thereafter to burn off at a level such as XX (FIG. 4) determined by the required height of the finished tumbler.

What we claim is:

1. In the manufacture from a viscous settable material of a hollow article having a solid base and a constricted portion between the base and the bowl of the article, the steps of subjecting a charge of the viscous material to a preliminary blowing action during which the blown portion is limited to that part of the charge which is to be above the constricted portion leaving a substantial portion unblown;

enclosing the charge in a mold having a necked portion corresponding to said constricted portion of the article and having a base which is movable upwardly and downwardly with respect to the sides;

causing an unblown accumulation of the material to gather at the lower end of the charge by allowing the charge to elongate with the unblown part thereof within and below the necked portion of the mould until an unblown accumulation of the material has settled over a surface of the mould base;

after the settling step and with the base in a lowered position, blowing that portion of the charge above said necked portion to form the bowl portion of the article therefrom while leaving unblown the portion of the charge within said mould necked portion and said accumulation below said necked portion as an unblown base-forming and base-connecting portion of the charge;

forming said unblown base-forming and base-connecting portion into the shape required for the article base and base-to-bowl connection by raising the base of the mould to press-mould this portion while still workable;

and removing the article from the mould after the material has set to a substantially rigid state.

2. In the manufacture from a viscous settable material of a hollow article having a solid base and a constricted base-to-bowl connection portion between the base and the bowl of the article, the steps of subjecting a charge of the viscous material to a preliminary blowing action limiting the blown portion to that part of the charge above the constricted portion and leaving a substantial portion unblown;

suspending the charge within a mould having a necked portion corresponding to said constricted portion of the article and having a base which is movable upwardly and downwardly with respect to the sides of the mould;

causing a substantial accumulation of the unblown portion of the charge to gather at the lower end thereof by allowing said lower end to settle on to the mould base while the mould base is in the lowered position;

subsequently, with the mould base still in a lowered position, blowing the bowl of the article from the portion of the charge above said necked portion of the mould while leaving unblown the portion of the charge within the necked portion and said accumulation below said necked portion as an unblown base-forming and base-to-bowl connecting portion of the charge;

press-moulding said unblown base-forming and base-to-bowl connecting portion into the required shape for the base and the constricted base-to-bowl connection of the article by raising the mould base while this portion is still workable;

and removing the article from the mould when substantially set.

References Cited in the file of this patent

UNITED STATES PATENTS

| | | |
|---|---|---|
| 1,888,393 | Roirant | Nov. 22, 1932 |
| 1,972,717 | Schutz | Sept. 4, 1934 |
| 1,977,091 | Schutz | Oct. 16, 1934 |

FOREIGN PATENTS

| | | |
|---|---|---|
| 382/31 | Great Britain | Jan. 7, 1932 |
| 617,445 | Great Britain | Feb. 7, 1949 |